United States Patent [19]
Zhang et al.

[11] Patent Number: 6,111,603
[45] Date of Patent: Aug. 29, 2000

[54] PORTABLE FIELD TESTER FOR MEASURING SIGNAL RECEPTION OF A DIGITALLY BROADCAST SIGNAL

[75] Inventors: Yong Zhang, Poway, Calif.; Seiji Kawaberi, Yokohana, Japan

[73] Assignees: Sony Corporation, Tokyo, Japan; Sony Electronics Inc., Park Ridge, N.J.

[21] Appl. No.: 09/282,797

[22] Filed: Mar. 31, 1999

Related U.S. Application Data

[60] Provisional application No. 60/102,768, Oct. 2, 1998.

[51] Int. Cl.[7] ................................................. H04N 17/00
[52] U.S. Cl. ......................... 348/192; 348/193; 348/180
[58] Field of Search .................................. 348/192, 193, 348/180, 607, 725, 726, 914; H04N 17/00

[56] References Cited

U.S. PATENT DOCUMENTS

| | | | |
|---|---|---|---|
| 5,282,019 | 1/1994 | Basile | 348/488 |
| 6,032,019 | 2/2000 | Chen | 348/193 |

*Primary Examiner*—Sherrier Hsia
*Attorney, Agent, or Firm*—Mayer, Fortkort & Williams; Karin Wiiliam, Esq.; Stuart Mayer, Esq.

[57] ABSTRACT

A portable HDTV testing device inserts a deterministic test signal having a frequency close to the symbol rate of the received HDTV signal. As the received HDTV signal is randomized prior to broadcast for synchronization purposes, the addition of the deterministic test signal to the randomized data signal is essentially equivalent to the addition of a random (or white) noise signal to an information bearing signal. The use of a deterministic test signal avoids the expense associated with a random signal generator, thus making possible an inexpensive and portable HDTV test device. To test the noise margin of a received signal, which is used to determine if the installation of the antenna and HDTV receiver is optimized, the test unit inserts known levels of the noise signal incrementally and measures the bit error rate until the bit error rate exceeds a known threshold above which proper decoding is not possible. The level of the noise signal at which the bit error rate exceeds the known threshold defines the noise margin of the received signal. The higher the noise margin, the stronger the received signal, and the closer to optimum the installation of the HDTV antenna and receiver. Thus, the present invention makes possible an inexpensive and portable HDTV test unit.

28 Claims, 3 Drawing Sheets

PORTABLE FIELD TESTER FOR MEASURING SIGNAL RECEPTION OF A DIGITALLY BROADCAST SIGNAL

Provisional Application 60/102,768 filed Oct. 2, 1998.

BACKGROUND OF THE INVENTION

The present invention relates generally to methods and apparatus for testing HDTV systems, and more particularly to a method and apparatus for testing an HDTV signal condition, HDTV terrestrial reception installation.

HDTV broadcasting standards for the United States were determined by the Advisory Committee on Advanced Television Service (ACATS). The transmission standard that was selected uses a vestigial sideband (VSB) with a symbol level of eight. Video and audio signals compressed into MPEG-2 bitstreams are multiplexed for broadcast. FIG. 1 shows a single segment of the 8VSB format. Each segment contains 832 symbols that include an MPEG-2 data packet having 187 bytes of data as well as 21 bytes of overhead.

In broadcasting, the signal is transmitted through free space and is thus exposed to various sources of noise. Multipath propagation generates a signal distortion which contributes to the noise level. To increase the signal's immunity to noise, Trellis coded modulation is used and Reed-Solomon parity coding is added for error-correction decoding. In addition, during the final stage of encoding, the data is randomized to avoid broadcasting long strings of 1s or 0s, which would result in a DC bias and would result in the loss of synchronization at the receiver.

All-digital HDTV transmission systems deliver about 20 Mb/s and by their nature have a very sharp threshold below which no reception at all is obtained. This sharp threshold is due to the rapid increase in the Bit Error Rate (BER) with a decreasing signal-to-noise ratio. Experimental testing in the field and laboratory has demonstrated that this threshold is about 15.16 db for a BER of $3 \times 10^{-6}$.

A useful measurement in determining the quality of a received signal is the noise margin, i.e., how much of a signal-to-noise degradation can be tolerated without exceeding the specified bit-error rate below which there is no reception. That is, the greater the noise margin, the better the signal quality. The noise margin can be used, for example, when evaluating antenna patterns for HDTV reception and when the antennas are installed and oriented in the field. Field operators can ensure that installation and setup is complete when the noise margin is maximized.

Known techniques for measuring the noise margin of a signal involve the use of a random or "white" noise source, which is a complex and expensive device, thus making it impractical for use in a portable device intended for use in the field during installation of antennas and receivers.

Accordingly, the present invention is directed to the problem of providing a simple and inexpensive method and apparatus for determining the noise margin of a digitally broadcast signal such as an HDTV signal.

SUMMARY OF THE INVENTION

The present invention solves this problem by recognizing that the noise margin of a digitally broadcast signal can be measured with a noise source that generates noise at a fixed frequency and amplitude, thus eliminating the need for a complex white noise source. A simple noise source of this type can be employed because the digitally broadcast signal itself is randomized prior to transmission to maintain transitions in the broadcast signal that are used by the phase lock loops in the receiver to achieve synchronization. The noise margin can therefore be determined because a random signal, the digitally broadcast signal, is added to a non-random signal, the noise generated by the noise source.

In accordance with the invention, an apparatus is provided for measuring signal reception of a digitally broadcast signal. The apparatus includes a digital noise source generating a deterministic digital signal and a user controllable attenuator coupled to the digital noise source. The attenuator adjusts the amplitude of the digital signal generated by the digital noise source. A portion of a digital receiver is coupled to the attenuator and receives the digitally broadcast signal and the digital signal to produce a bitstream. The digital receiver portion also calculates a bit error rate in the bitstream. A display is provided for displaying an amplitude level of the digital signal applied to the digital receiver portion.

In accordance with one aspect of the invention, the deterministic digital signal may have a fixed frequency and amplitude. The clock rate of the fixed frequency may be close to the symbol rate of the digitally broadcast signal.

In accordance with another aspect of the invention, the digitally broadcast signal has a predetermined number of symbol levels and the attenuator is incrementally adjustable in increments corresponding to a preselected fraction of the interval between adjacent symbol levels.

In accordance with yet another aspect of the invention, a method is provided for measuring signal reception of a digitally broadcast signal. The method begins by receiving the digitally broadcast signal to produce a digital bitstream. Next, a digital signal is generated and added to the digital bitstream to produce a reduced-fidelity bitstream. A determination is then made whether a bit error rate of the reduced-fidelity bitstream exceeds a predetermined threshold. Finally, if the bit error rate does not exceed the predetermined threshold, the amplitude of the digital signal is increased and the procedure is repeated until the predetermined threshold is exceeded.

DETAILED DESCRIPTION

The present invention is directed to a method and apparatus for measuring the noise margin of a digitally broadcast signal. While the invention will be described in terms of a digital HDTV broadcasting system, one of ordinary skill in the art will recognize that the invention is equally applicable to other digital transmission formats including those employed in cellular communications, for example.

Figure 2:
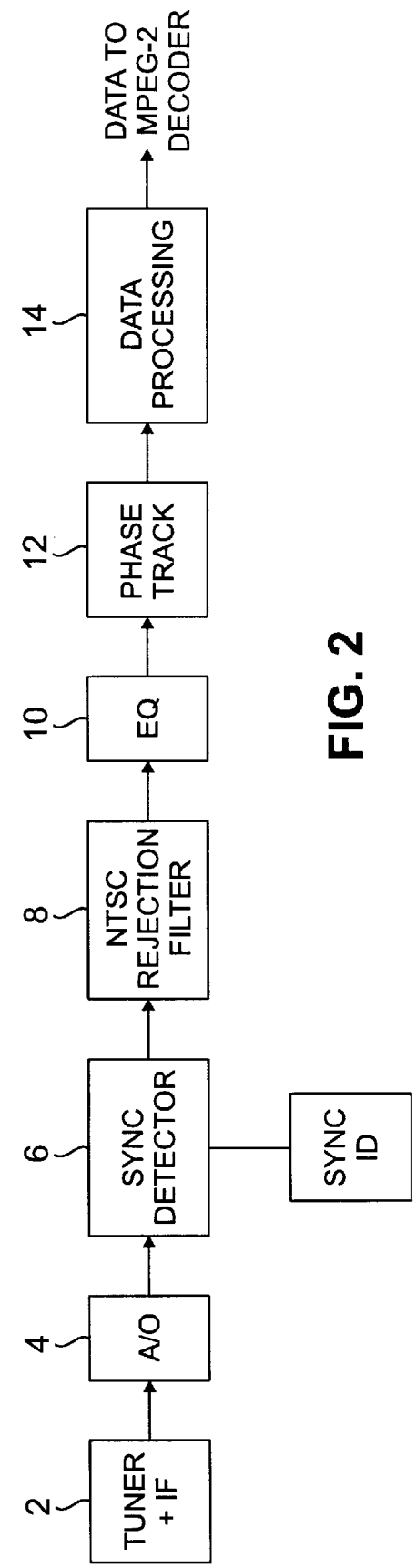
FIG. 2 shows a block diagram of an exemplary HDTV receiver front-end.

The invention employs the front-end of a conventional digital receiver for receiving and decoding a digital signal in a conventional manner. FIG. 2 shows a block diagram of an exemplary HDTV receiver front-end. The operation of the HDTV receiver will be briefly reviewed.

A signal input via an antenna (not shown) is converted into an IF signal in tuner 2 according to the channel that is selected. An IF circuit incorporated in tuner 2 provides a baseband signal. The IF circuit provides a maximum 65 db gain centered at 44 MHz with a flat 6 MHz signal. An AGC circuit is also applied to the IF circuit to adjust its gain to an appropriate level. The baseband signal provided by the IF circuit is received by A/D converter 4 and converted into a digital signal.

The Tuner and IF Circuits

The tuner 2 is typically of conventional analog design. It includes an RF filter that is a wideband bandpass filter having a passband between 50–810 Mhz. A RF stage with 10 db gain essentially determines the receiver noise figure, which is about 7–9 db over the entire reception range. The mixer output bandwidth is 6 MHz with an IF frequency centered at 44 MHz. A delayed AGC will be applied to the RF stage when the tuner receives a strong signal. The IF circuit provides a maximum gain of 65 db, centered at 44 MHz with a flat 6 Mhz −6 dbm bandwidth and a high reception selectivity. The AGC is applied to the IF stage to adjust its gain so that it accommodates the signal strength. The AGC range can be as high as 60 db. The IF-signal is converted to a baseband signal by a FPLL synchronous demodulator. Based on the pilot, the carrier can be recovered within a range of ±100 Khz.

A/D Converter

The IF output provided by tuner 2 is directed to A/D converter 4, which samples the signal at 2*Fbaud. The sampled data is next sent to the VSB demodulator.

Segment Sync and Symbol Clock Recovery

Synchronous detector 6 separates the repetitive data segment syncs from the random data with a narrow bandwidth segment integrator. The data segment syncs are used to regenerate a properly phased 10.76 MHz symbol clock and can also be used to generate a coherent AGC control signal. The segment sync amplitude and pilot amplitude are in each case expressed in terms of the integer-numbered data levels. For the VSB system, data segment sync detection and clock recovery are both reliable at S/N ratios of zero db or even less.

NTSC Co-Channel Rejection

An NTSC co-channel rejection filter 8 is used to reduce interference from NTSC signals. The NTSC rejection filter 8 is a 12-symbol comb filter, which translates it into a 15-level signal. The filter can be switched out to achieve a 3 dB white-noise-only improvement. Switching does not interrupt reception and therefore can occur automatically as conditions change.

The Equalizer

An equalizer (EQ) 10 functions as a synchronous decision feedback equalizer (DFE). The EQ 10 performs deghosting and reduces intersymbol interference. It is optimized to eliminate long-span ghosts typically present in terrestrial broadcasts. These distortions can come from the transmission channel or from imperfections within the receiver.

The Phase Tracker

A phase tracking loop 12 is an additional decision feedback loop which further tracks out phase noise to remove any remaining phase noise that was not tracked by the FPLL carrier recovery block. At the phase tracking loop 12, the system is already frequency-locked to the pilot by the IF PLL. A first order loop is used to maximize the phase tracking performance.

Data Processing Block

In data processor 14, a trellis decoder uses the received level to correct any data errors resulting from short bursts of interference, such as impulse noise or NTSC co-channel interference. A convolutional data de-interleaver performs the exact inverse function of the transmitter convolutional interleaver. The noise created by strong NTSC co-channel signals passing through the NTSC rejection filter can be handled reliably due to interleaving and Reed-Solomon coding processing. The Reed-Solomon decoder uses 20 parity bytes from every segment to perform byte-error correction. The R-S decoder can correct up to 10 bytes per data segment. Finally, the data has to be derandomized to return it to its original MPEG-2 format. The data is output to an MPEG-2 decoder in an 8-bit byte format.

One of ordinary skill in the art will recognize that the previously described HDTV digital receiver front-end is provided for illustrative purposes only. The present invention more generally encompasses any digital receiver that is used to receive a digitally broadcast signal and is thus not limited to an HDTV digital receiver.

According to the present invention, the noise margin of a digitally broadcast signal can be measured with a non-random or deterministic noise source. In its simplest terms, the noise margin of any given information-bearing signal is determined by adding a random signal (noise) to a non-random signal (the information-bearing signal). However, since digitally broadcast data such as data broadcast in the 8VSB format has already been randomized, the broadcast signal itself may be treated as the random signal to which a non-random signal may be added. That is, the broadcast signal may be thought of as the noise component and thus the signal added by the noise margin measuring device may be a deterministic signal. This is equivalent to adding random noise to an information-bearing signal.

For purposes of clarity, in what follows the digitally broadcast signal will continue to be referred to as the data signal and the signal added by the measuring device will be referred to as the noise. However, based on the above analysis, it should be recognized that the noise that is added is actually a non-random or deterministic signal.

Figure 3:
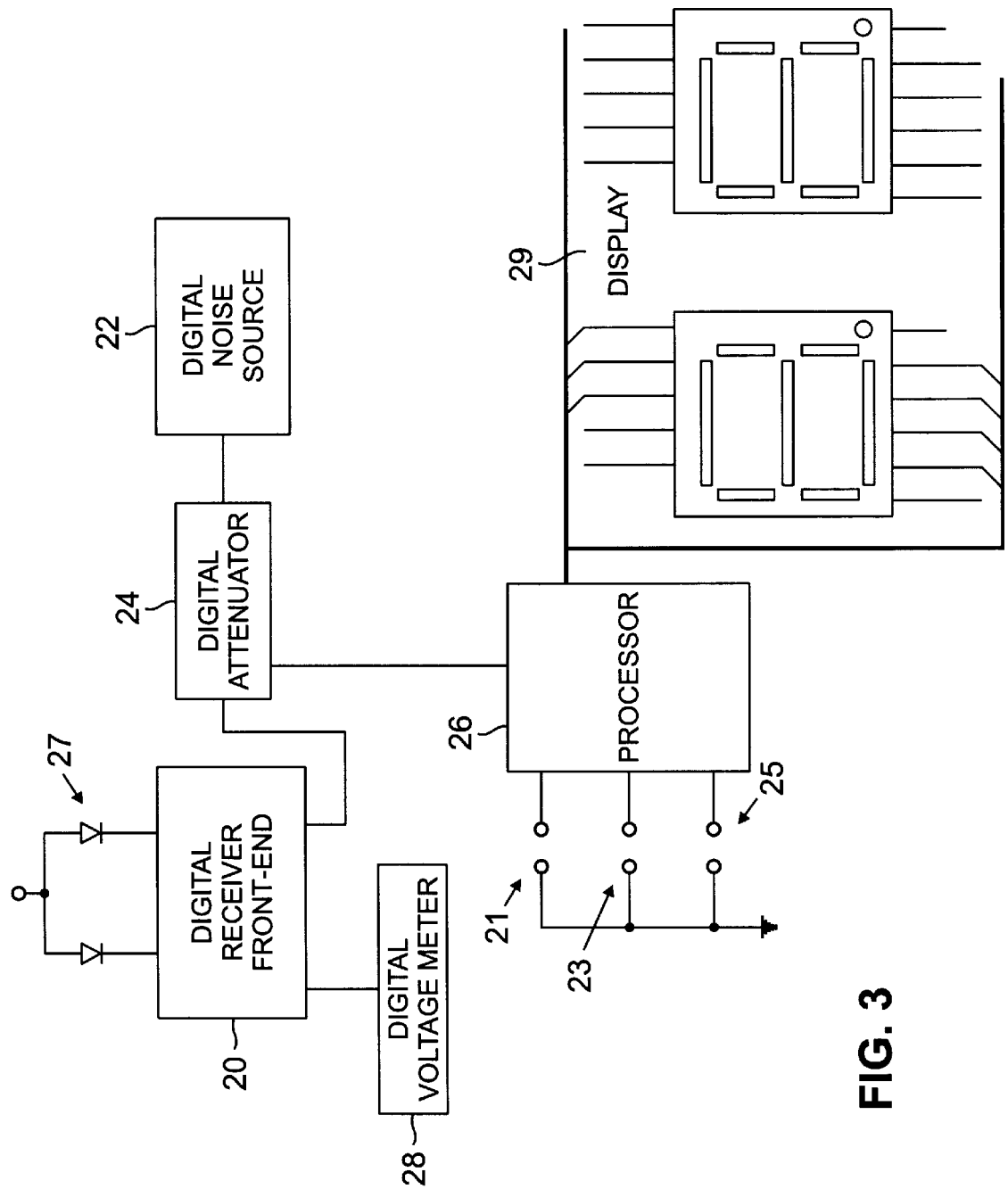
FIG. 3 shows a block diagram of one embodiment of the digital noise margin measurement device constructed in accordance with the present invention.

FIG. 3 shows a block diagram of the digital noise margin measurement device constructed in accordance with the present invention. The device inserts known levels of noise into a signal received by a conventional digital receiver front-end such as the HDTV receiver front-end shown in FIG. 2. The noise levels are increased until the receiver indicates that reception has been discontinued because the maximum tolerable BER has been exceeded. In other words, the noise levels are increased until the received signal falls below a threshold BER at which the uncorrectable errors prevent proper decoding. The noise level at which this BER is exceeded defines the noise margin.

As shown, the measurement device includes a digital receiver front-end 20, digital noise source 22, digital attenuator 24, processor 26 for controlling the attenuator 24, and display 29 for displaying the value of the noise margin. The display 29 may also indicate the digital channel number of the digital signal undergoing testing. An optional digital voltage meter 28 may be provided for measuring the AGC voltage generated in the receiver. The AGC voltage is a direct measure of the RF field strength. In particular, the AGC voltage will decrease as the RF field strength increases, and thus the AGC voltage will in most cases be minimized when the noise margin is maximized. As a result, the AGC voltage can be used to confirm when the maximum noise margin has been achieved.

In accordance with the present invention, the digital noise source 22 generates a non-random noise signal. To ensure that the digital noise source is a simple, inexpensive component suitable for a portable device, the noise signal is generated at a fixed frequency and amplitude. In the simplest case the noise signal is a square wave, although the present invention encompasses other waveforms as well. The amplitude of the noise signal can be changed in discrete amounts by the digital attenuator 24. The frequency of the noise signal is fixed and is advantageously selected to be close to the symbol rate so that the HDTV bitstream (i.e., the unpacketized MPEG-2 data) does in fact appear random with respect to the noise signal that is added to it. For example, the inventors have determined that for a symbol rate of 5.38 Mhz, the frequency of the noise signal is preferably between about 5 and 5.5 Mhz. Since the clock generating the noise signal is not synchronized with the clock generating the data symbols, the added noise may be in phase or out of phase with the data. In either case the result is equivalent to the addition of white noise. Finally, the digital noise signal is directed to A/D converter 4 in the receiver front-end so that the noise may be added to the HDTV bitstream.

In the embodiment of the invention shown in FIG. 3, the digital attenuator 24 is a resistive network having 100 output taps so that the amplitude of the noise can be incrementally adjusted in 100 equal divisions. The user controls the digital attenuator 24 via the processor 26. The front panel of the device contains switches 21 and 23 for directing the processor 26 to increment and decrement the noise level by one unit at a time while another switch 25 directs the processor to clear the attenuator 24 so that no noise is inserted. The digital receiver front-end includes indicators such as LED's 27 for indicating when reception is normal and when reception has been interrupted because the BER has exceeded the error correcting capabilities of the receiver.

Figure 1:
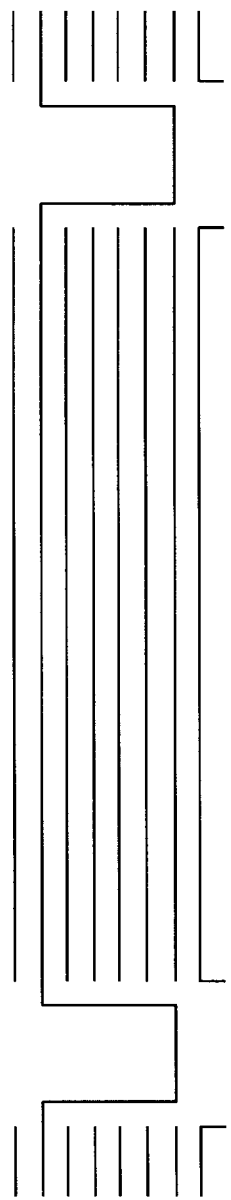
FIG. 1 shows a single segment of the vestigial sideband format employed in broadcasting HDTV.

For convenience, the noise margin may be measured in terms of Digital Noise Units (DNUs). A DNU is defined as some fraction of the interval between any two of the 8 symbol levels used in the 8VSB transmission format (see FIG. 1). For purposes of illustration, a DNU will be defined as $\frac{1}{128}^{th}$ of the interval between any two levels. That is, each symbol level is equivalent to 128 DNUs. An ideal HDTV signal (i.e., a signal without noise) can fluctuate halfway between any two symbol levels before its value become indeterminate and thus has a noise margin equal to 64 DNUs.

In one embodiment of the invention, the resistive network of attenuator 24 is calibrated so that it injects into the HDTV bit stream one DNU of noise per increment. That is, the amplitude of the noise signal can be increased or decreased by the user in units equivalent to one DNU. If the attenuator 24 has been calibrated in this manner, the noise margin can be directly read from the display 29 in units of DNUs.

Figure 4:
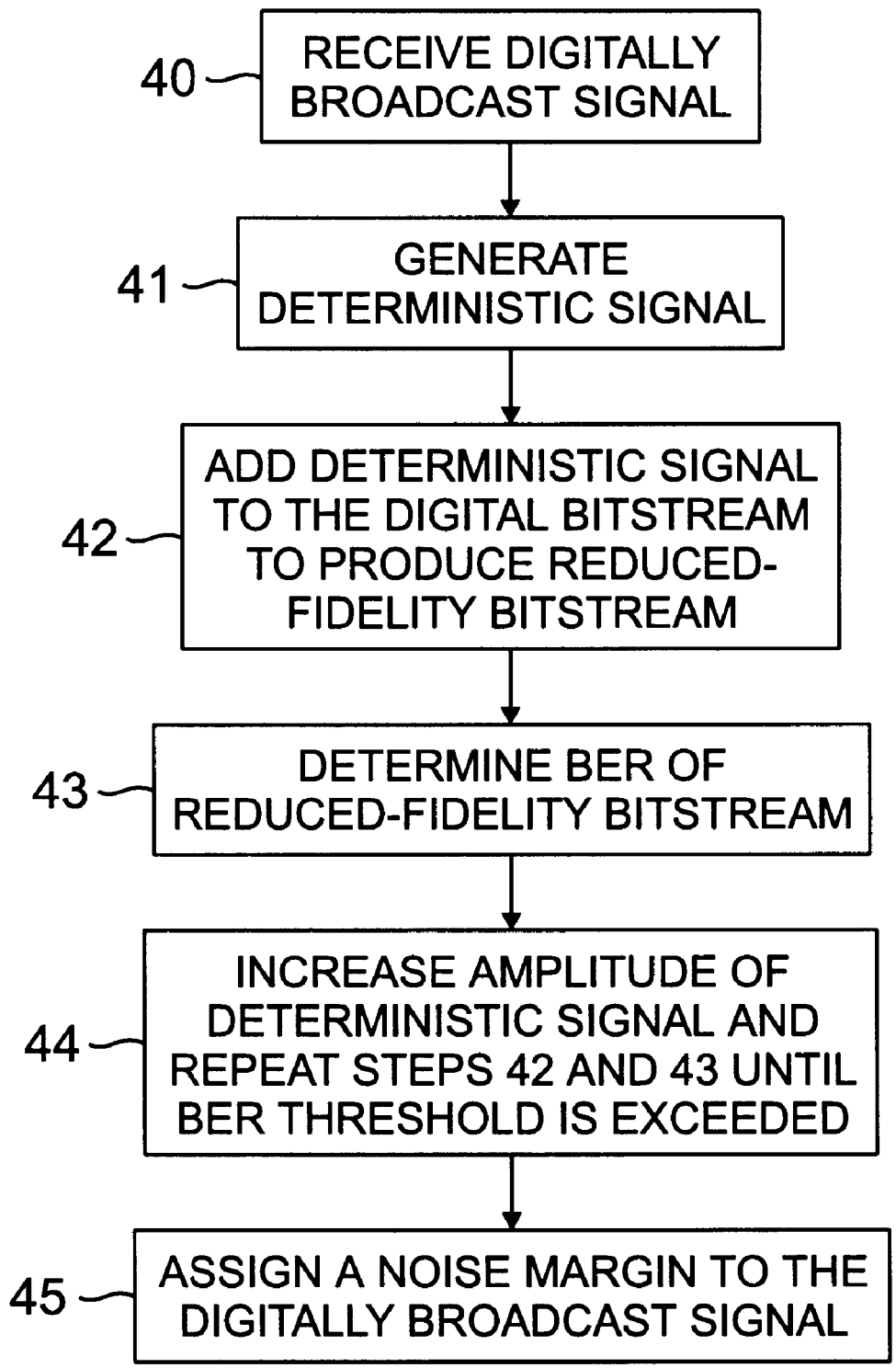
FIG. 4 shows a flowchart of the steps performed by the operator of the apparatus of the present invention.

FIG. 4 shows a flowchart of the steps performed by the operator of the inventive measurement device. First, in step 40, the digitally broadcast signal is received by the receiver front-end and converted to a bitstream that has not yet been derandomized. In step 41, the deterministic digital signal is generated and in step 42 added to the bitstream to produce a reduced-fidelity bitstream. The receiver front-end, in step 43, determines if the BER of the reduced-fidelity bitstream exceeds a predetermined threshold. The predetermined threshold corresponds to a BER above which proper decoding is not possible. If the BER does not exceed the predetermined threshold, the amplitude of the deterministic digital signal is incrementally increased in step 44 and steps 42 and 43 are then repeated. The amplitude of the deterministic digital signal continues to be incremented until the BER does exceed the prescribed threshold. Finally, in step 45, a noise margin is assigned to the digitally broadcast signal. The noise margin corresponds to the amplitude of the deterministic signal at which the prescribed threshold is exceeded.

What is claimed is:

1. An apparatus for measuring signal reception of a digitally broadcast signal, said apparatus comprising:
   a digital noise source generating a deterministic digital signal;
   a user controllable attenuator coupled to the digital noise source, said attenuator adjusting the amplitude of the digital signal generated by the digital noise source;
   a portion of a digital receiver coupled to the attenuator, said digital receiver portion receiving the digitally broadcast signal and the digital signal to produce a bitstream and calculating a bit error rate in the bitstream; and
   a display displaying an amplitude level of the digital signal applied to the digital receiver portion.

2. The apparatus according to claim 1, wherein the deterministic digital signal has a fixed frequency and amplitude.

3. The apparatus of claim 2 wherein the fixed frequency has a clock rate close to a symbol rate of the digitally broadcast signal.

4. The apparatus according to claim 1, wherein the digitally broadcast signal has a predetermined number of symbol levels and the attenuator is incrementally adjustable in increments corresponding to a preselected fraction of the interval between adjacent symbol levels.

5. The apparatus according to claim 4, wherein the digitally broadcast signal is an HDTV signal.

6. The apparatus according to claim 5, wherein the preselected fraction is $\frac{1}{128}^{th}$ of the interval between adjacent symbol levels.

7. The apparatus according to claim 4, wherein the HDTV signal conforms to a vestigial sideband format with the predetermined number of symbol levels equal to eight.

8. The apparatus according to claim 1, wherein the digitally broadcast signal is an HDTV signal.

9. The apparatus according to claim 8, wherein the HDTV signal conforms to a vestigial sideband format with eight symbol levels.

10. The apparatus of claim 1 wherein said digital receiver portion includes a tuner, an A/D converter, a synchronizing detector, an NTSC rejection filter, an equalizer, a phase tracking loop and an error correcting decoder.

11. The apparatus according to claim 1, wherein the attenuator comprises a resistive network.

12. The apparatus according to claim 1, wherein the digital receiver includes an A/D converter and the attenuator is coupled to the receiver whereby the digital signal is applied to the A/D converter.

13. The apparatus according to claim 1, wherein the digital signal comprises a square wave.

14. The apparatus according to claim 1, further comprising an indicator indicating when the bit error rate exceeds a predetermined threshold.

15. The apparatus according to claim 14, wherein the predetermined threshold equals a bit error rate at which the digitally broadcast signal cannot be decoded.

16. The apparatus of claim 1 wherein the display further displays a channel number of the digitally broadcast signal received by the digital receiver portion.

17. The apparatus of claim 1 further comprising a voltage meter coupled to the digital receiver portion for measuring AGC voltage.

18. A method for measuring signal reception of a digitally broadcast signal, comprising the steps of:
   a) receiving the digitally broadcast signal to produce a digital bitstream;

b) generating a digital signal;

c) adding the digital signal to the digital bitstream to produce a reduced-fidelity bitstream;

d) determining if a bit error rate of the reduced-fidelity bitstream exceeds a predetermined threshold; and e) increasing the amplitude of the digital signal and repeating steps b) through d), if the bit error rate does not exceed the predetermined threshold, until the predetermined threshold is exceeded.

19. The method according to claim 18, further comprising the step of:

f) assigning a noise margin to the digitally broadcast signal that corresponds to the amplitude of the digital signal at which the prescribed threshold is exceeded.

20. The method according to claim 18, wherein the predetermined threshold equals a bit error rate at which the digitally broadcast signal cannot be decoded.

21. The method according to claim 18, wherein the digital signal includes a deterministic signal.

22. The method according to claim 18, wherein the digital signal includes a non-random signal.

23. An apparatus for testing a broadcast receiver comprising:

a) a signal generator generating a noise representative signal;

b) a receiver being coupled to the generator converting a broadcast signal to a randomized bit stream;

c) a bit error rate calculator determining a bit error rate in the randomized bit stream.

24. The apparatus according to claim 23, further comprising a controller controlling a level of the noise representative signal being generated by the signal generator and controllably increasing the level of the noise representative signal until the bit error rate exceeds a predetermined threshold.

25. The apparatus according to claim 24, further comprising a display wherein the controller outputs the level of the noise signal at which the bit error rate first exceeds the predetermined threshold as a noise margin of the receiver.

26. The apparatus according to claim 23, wherein the noise signal comprises a deterministic signal.

27. The apparatus according to claim 23, wherein the noise signal comprises a non-random signal.

28. A device for determining a noise margin of a receiver comprising:

a) means for generating a non-random noise signal;

b) means for inserting the non-random noise signal into a received signal;

c) means for converting the received signal plus the non-random signal into a randomized bit stream;

d) means for calculating a bit error rate in the randomized bit stream;

e) means for controllably increasing a signal level of the non-random noise signal;

f) means for determining whether the bit error rate has exceeded a predetermined threshold; and g) means for outputting a signal level of the non-random noise signal at which the bit error rate exceeds the predetermined threshold as indicative of the noise margin of the receiver.

* * * * *